US012292003B2

(12) United States Patent
Gonyou et al.

(10) Patent No.: US 12,292,003 B2
(45) Date of Patent: May 6, 2025

(54) INLEAKAGE MANAGEMENT APPARATUS

(71) Applicant: GENERAL ELECTRIC COMPANY, Schenectady, NY (US)

(72) Inventors: Craig Alan Gonyou, Blanchester, OH (US); Nathan Joel Mullenix, West Chester, OH (US); Fei Huang, Carmel, IN (US)

(73) Assignee: General Electric Company, Evandale, OH (US)

( * ) Notice: Subject to any disclaimer, the term of this patent is extended or adjusted under 35 U.S.C. 154(b) by 0 days.

(21) Appl. No.: 17/571,609

(22) Filed: Jan. 10, 2022

(65) Prior Publication Data

US 2022/0128007 A1 Apr. 28, 2022

Related U.S. Application Data

(63) Continuation of application No. 15/622,262, filed on Jun. 14, 2017, now Pat. No. 11,242,804.

(51) Int. Cl.
*F02C 7/28* (2006.01)
*F02C 3/04* (2006.01)
(Continued)

(52) U.S. Cl.
CPC ................ *F02C 7/28* (2013.01); *F02C 3/04* (2013.01); *F02C 7/16* (2013.01); *F02C 7/264* (2013.01);
(Continued)

(58) Field of Classification Search
None
See application file for complete search history.

(56) References Cited

U.S. PATENT DOCUMENTS 3,048,015 A    8/1962  Barrelle et al.
3,602,605 A *  8/1971  Lee .......................... F01D 5/08
                                            416/220 A
(Continued)

FOREIGN PATENT DOCUMENTS

CN         106246355 A    12/2016

OTHER PUBLICATIONS

Chinese Patent Office, Office Action re Corresponding Application No. 201810612390.6, Feb. 1, 2021, 8 pages, China.
(Continued)

*Primary Examiner* — Gerald L Sung
*Assistant Examiner* — Jacek Lisowski
(74) *Attorney, Agent, or Firm* — McGarry Bair PC

(57) ABSTRACT

A leakage management assembly for an orifice configured to limit a flow of at least one of a leakage fluid and a cooling fluid past an instrument positioned within the orifice are provided. The leakage management assembly includes a labyrinth ferrule including an annular ferrule body having a central bore extending therethrough. The labyrinth ferrule further includes an annular assembly cone formed at a first end of the labyrinth ferrule. The annular assembly cone includes an annular convergent lip and is configured to facilitate directing the instrument into the central bore. The labyrinth ferrule also includes a plurality of labyrinthine annular restrictions extending from a radially inner surface of the annular body toward the central bore. A combustor and a gas turbine engine including such a seal assembly are also provided.

18 Claims, 9 Drawing Sheets

(51) Int. Cl.
  *F02C 7/16* (2006.01)
  *F02C 7/264* (2006.01)
  *F23R 3/00* (2006.01)

(52) U.S. Cl.
  CPC ................ *F23R 3/00* (2013.01); *F23R 3/002* (2013.01); *F05D 2220/32* (2013.01); *F05D 2240/35* (2013.01); *F05D 2240/55* (2013.01); *F05D 2250/611* (2013.01); *F23R 2900/00012* (2013.01)

(56) References Cited

U.S. PATENT DOCUMENTS

| | | | |
|---|---|---|---|
| 3,990,834 A | 11/1976 | DuBell et al. | |
| 5,190,440 A * | 3/1993 | Maier | F04D 29/162 |
| | | | 277/412 |
| 5,321,951 A | 6/1994 | Falls et al. | |
| 7,013,364 B2 | 3/2006 | Pidcock et al. | |
| 7,101,173 B2 | 9/2006 | Hernandez et al. | |
| 7,216,488 B2 | 5/2007 | Howell et al. | |
| 7,546,739 B2 | 6/2009 | Holland et al. | |
| 7,946,119 B2 | 5/2011 | Geary | |
| 8,099,963 B2 | 1/2012 | Pieussergues et al. | |
| 8,479,490 B2 | 7/2013 | Zupanc et al. | |
| 9,170,022 B2 | 10/2015 | Grimm et al. | |
| 9,587,831 B2 * | 3/2017 | Jause | F23R 3/04 |
| 10,041,413 B2 | 8/2018 | Huang et al. | |
| 2002/0069645 A1 * | 6/2002 | Mowill | F23R 3/286 |
| | | | 60/737 |
| 2007/0051110 A1 * | 3/2007 | Holland | F23R 3/06 |
| | | | 60/776 |
| 2007/0110563 A1 * | 5/2007 | Janke | F01D 11/08 |
| | | | 415/115 |
| 2012/0240583 A1 * | 9/2012 | Penz | F23R 3/002 |
| | | | 60/722 |
| 2016/0025221 A1 | 1/2016 | Penz | |
| 2016/0169023 A1 | 6/2016 | Mizumi et al. | |
| 2017/0022838 A1 * | 1/2017 | Kuwamura | F01D 5/225 |
| 2017/0114655 A1 * | 4/2017 | Kim | F01D 11/04 |

OTHER PUBLICATIONS

U.S. Appl. No. 14/969,372, filed Dec. 15, 2015, entitled "Gas Turbine Engine With Igniter Stack or Borescope Mount Having Noncollinear Cooling Passages."

U.S. Appl. No. 14/935,758, filed Nov. 9, 2015, entitled "Igniter for a Gas Turbine Engine."

* cited by examiner

INLEAKAGE MANAGEMENT APPARATUS

CROSS-REFERENCE TO RELATED APPLICATIONS

This application is a continuation of and claims priority to U.S. application Ser. No. 15/622,262, filed Jun. 14, 2021, now U.S. Pat. No. 11,242,804 issued Feb. 8, 2022, the contents of which are incorporated herein by reference.

BACKGROUND

The field of the disclosure relates generally to instrument ports and, more particularly, to an apparatus for managing leakage inflow velocities in instrument ports in component sidewalls.

At least some known gas turbine engines include a compressor, a combustor, and a turbine in a serial flow arrangement. The compressor compresses air that is channeled into the combustor. The combustor directs a mixture of the air and a flow of fuel into a combustion chamber within the combustor to create high temperature gases. The combustion gases are channeled to the turbine to power the compressor and out of the gas turbine engine to create thrust. An ignitor ignites the mixture of air and fuel within the combustor. The ignitor extends through a combustor liner into the combustion chamber through an orifice in the combustion liner. A boss circumscribes the orifice and receives the ignitor for positioning and securing in place.

A flow of leakage air is typically channeled into the boss and around the ignitor to cool the ignitor and a region around the boss. The leakage air is a flow of cooling air as well as a flow of buffer air preventing the high temperature gases from reaching the ignitor and the boss. If the boss is not cooled with leakage air, parts of the boss may experience thermal stress. However, if the velocity of the flow of leakage into the combustor is too high, the leakage air will entrain the high temperature gases, pulling the high temperature gases toward the ignitor and boss.

BRIEF DESCRIPTION

In one aspect, leakage management assembly for an orifice configured to at least one of (i) limit a flow of a leakage fluid past an instrument positioned within the orifice and extending into a hot gas path, or (ii) channel a flow of a cooling fluid to the instrument, the leakage management assembly comprising a labyrinth ferrule including an annular ferrule body having a central bore extending therethrough, the central bore defining a central axis, an annular assembly cone formed at a first end of the labyrinth ferrule, the annular assembly cone comprising an annular convergent lip, the annular assembly cone configured to facilitate directing the instrument into the central bore, and at least one labyrinth annular restriction located between the annular assembly cone and a radially inner surface of the annular ferrule body with respect to the central axis, and toward the central bore and terminating radially prior to any portion of the instrument in the central bore, with respect to the central axis, to define a leakage gap between the at least one labyrinth annular restriction and the instrument, wherein the at least one labyrinth annular restriction reduces a velocity of the leakage fluid, while allowing at least a portion of the leakage fluid to flow past the at least one labyrinth annular restriction and through the leakage gap.

In another aspect, a combustor comprising a liner including an orifice, the liner defining a hot gas path configured to channel a flow of a hot gas in a first direction, and a seal assembly coupled to the liner and positioned within the orifice, the seal assembly configured to separate the hot gas path from a first region outside the liner, the seal assembly comprising a labyrinth ferrule comprising an annular ferrule body comprising a central bore extending therethrough, the central bore defining a central axis and configured to receive an instrument therethrough, an annular assembly cone formed at a first end of the labyrinth ferrule, the annular assembly cone comprising an annular convergent lip, the annular assembly cone configured to direct a flow of a cooling fluid into the central bore, and at least one labyrinth annular restriction located between the annular assembly cone and a radially inner surface of the annular ferrule body with respect to the central axis, and toward the central bore and terminating radially prior to any portion of the instrument in the central bore, with respect to the central axis, to define a leakage gap between the at least one labyrinth annular restriction and the instrument, wherein the at least one labyrinth annular restriction reduces a velocity of a leakage fluid, while allowing at least a portion of the leakage fluid to flow past the at least one labyrinth annular restriction and through the leakage gap.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a perspective view of an aircraft.

FIG. 2 is a schematic cross-sectional view of a gas turbine engine in accordance with an exemplary embodiment of the present disclosure that may be used with the aircraft shown in FIG. 1.

FIG. 3 is a schematic cross-sectional view of a combustor in accordance with an exemplary embodiment of the present disclosure that may be used with the gas turbine engine shown in FIG. 2.

FIG. 4 is schematic cross-sectional view of a portion of the combustor shown in FIG. 3.

FIG. 5 is a partial schematic diagram of another seal assembly for use in the combustor shown in FIG. 4.

FIG. 6 is a partial schematic diagram of another seal assembly for use in the combustor shown in FIG. 4.

FIG. 7 is a partial schematic diagram of another seal assembly for use in the combustor shown in FIG. 4.

FIG. 8 is a partial schematic diagram of another seal assembly for use in the combustor shown in FIG. 4.

FIG. 9 is a partial schematic diagram of another seal assembly for use in the combustor shown in FIG. 4.

Figure 1:
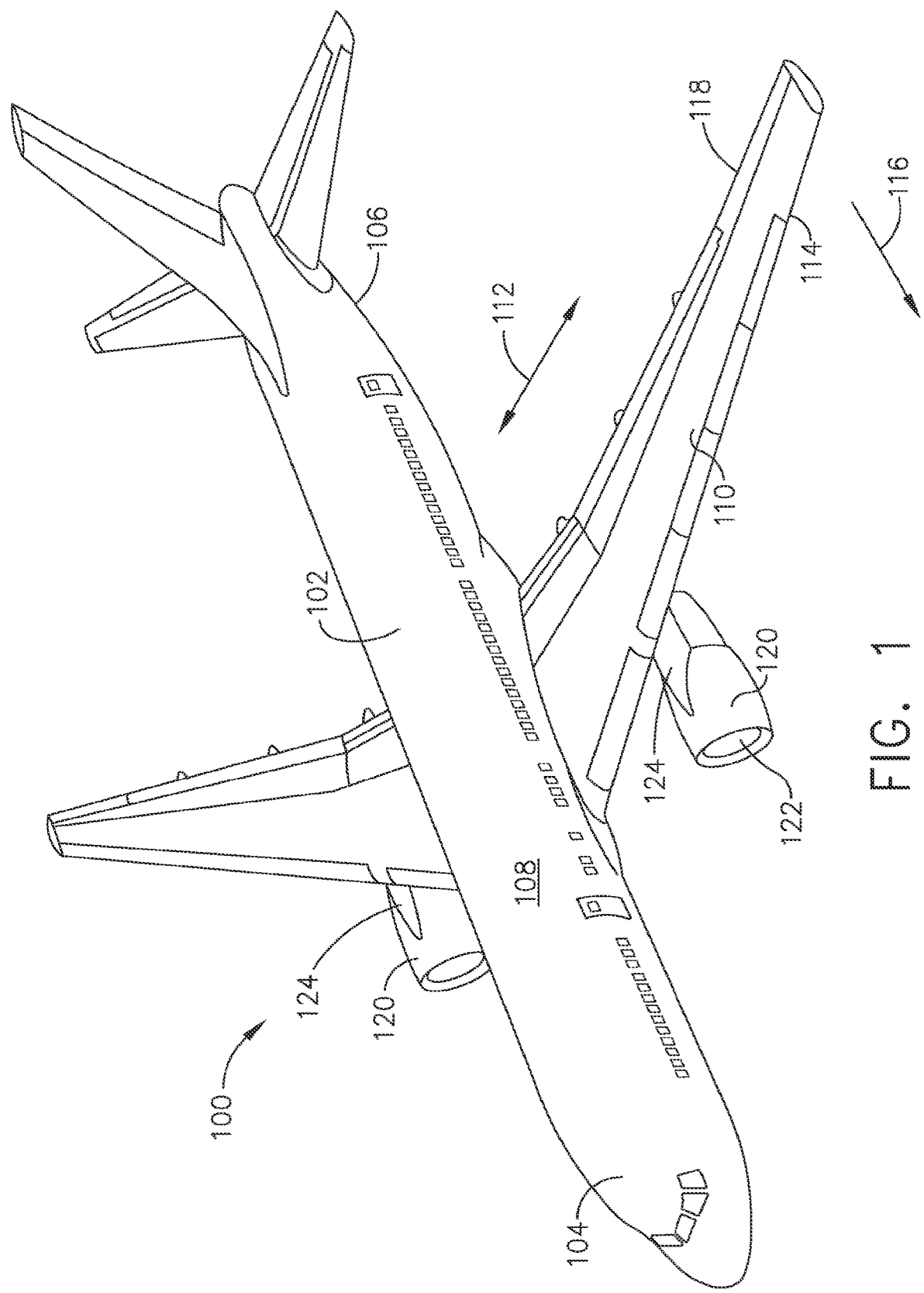
FIGS. 1-9 show example embodiments of the apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following detailed description illustrates embodiments of the disclosure by way of example and not by way of limitation. It is contemplated that the disclosure has general application to a system for cooling, for example, ignitor ports and borescope ports in an aircraft engine.

Embodiments of the leakage management assembly described herein provide an efficient method for managing a flow of leakage and cooling air into a combustor through the leakage management assembly. A multi-part ferrule assembly is positioned within an orifice of a component, such as at an ignitor region of a combustor, and is coupled to an outer case of the component. The multi-part ferrule assembly includes a support tower having a base that fits within the orifice, and a labyrinth ferrule stacked on top of the support tower. The support tower and labyrinth ferrule have central bores that are coaxially aligned and configured to receive a plug or penetration such as, but not limited to a borescope, ignitor, or other instrument. The ferrule body circumscribes the instrument positioned within the support tower. The seal, the ignitor, and the support tower define a support tower cavity circumscribing a portion of the ignitor extending into the combustor. The ferrule body and the instrument define a central bore configured to minimize a flow of leakage air into the support tower cavity. Restrictions extend from the seal into the central bore and restrict the flow of leakage air into the combustor and reduce inleakage flow velocity. The reduced velocity of the leakage air entering the support tower cavity reduces the entrainment of the high temperature gas. Reducing the entrainment of the high temperature gases reduces the flow of high temperature gases entering the support tower cavity and contacting the ignitor tower and the seal. Reducing the entrainment of high temperature gases also reduces the flow of cooling air required to buffer and cool the support tower cavity. The remaining cooling air is used to cool difficult to cool regions around the support tower by channeling the remaining cooling air though the cooling holes to the difficult to cool regions. Thus, the seal reduces the velocity of leakage air into the combustor and decreases the thermal stress of the support tower and the seal.

FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one gas turbine engine 120 configured to drive a bladed rotatable member 122 or fan to generate thrust. Gas turbine engine 120 is coupled to at least one of wing 110 and fuselage 102. At least one gas turbine engine 120 is connected to an engine pylon 124, which may connect at least one gas turbine engine 120 to aircraft 100. Engine pylon 124, for example, may couple at least one gas turbine engine 120 to at least one of wing 110 and fuselage 102, for example, in a pusher configuration (not shown) proximate tail 106.

Figure 2:
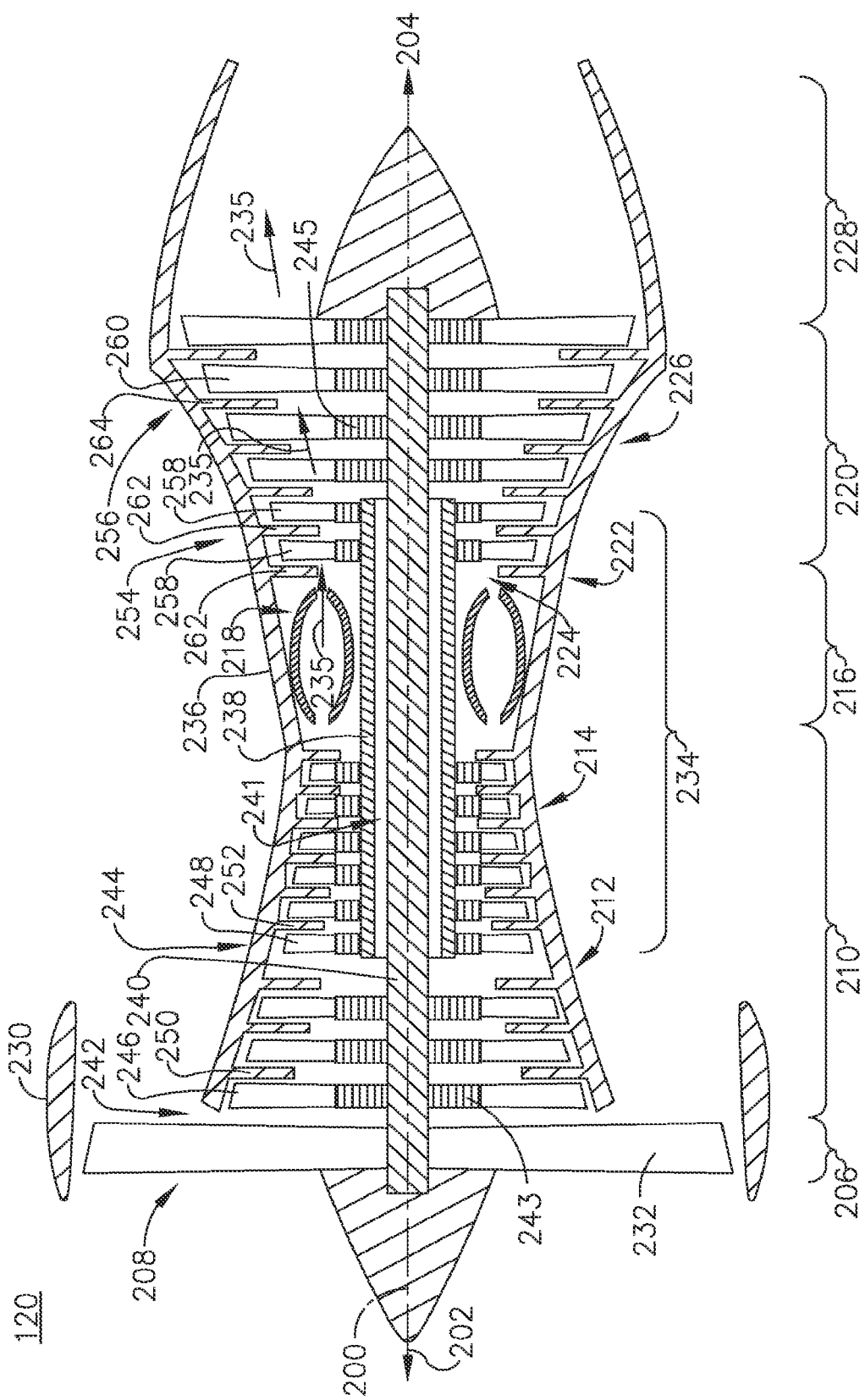

FIG. 2 is a schematic cross-sectional diagram of gas turbine engine 120. Gas turbine engine 120 has a generally longitudinally extending axis or centerline 200 extending in a forward direction 202 and an aft direction 204. Gas turbine engine 120 includes, in downstream serial flow relationship, a fan section 206 including a fan 208, a compressor section 210 including a booster or low pressure (LP) compressor 212 and a high pressure (HP) compressor 214, a combustion section 216 including a combustor 218, a turbine section 220 including a HP turbine 222 and a LP turbine 226, and an exhaust section 228.

Fan section 206 includes a fan casing 230 surrounding fan 208. Fan 208 includes a plurality of fan blades 232 disposed radially about centerline 200. HP compressor 214, combustor 218, and HP turbine 222 form an engine core 234 of gas turbine engine 120, which generates combustion gases 235. Engine core 234 is surrounded by core casing 236, which can be coupled with fan casing 230.

An HP shaft or spool 238 disposed coaxially about centerline 200 of gas turbine engine 120 drivingly connects HP turbine 222 to HP compressor 214. A LP shaft or spool 240, which is disposed coaxially about centerline 200 of gas turbine engine 120 within larger diameter annular HP spool 238, drivingly connects LP turbine 226 to LP compressor 212 and fan 208. The portions of gas turbine engine 120 mounted to and rotating with either or both of spools 238, 240 are also referred to individually or collectively as a rotor 241.

LP compressor 212 and HP compressor 214 respectively include a plurality of compressor stages 242, 244, in which a set of compressor blades 246, 248 rotate relative to a corresponding set of static compressor vanes 250, 252 (also called a nozzle) to compress or pressurize the stream of fluid passing through the stage. In a single compressor stage 242, 244, a plurality of compressor blades 246, 248 can be provided in a ring and can extend radially outwardly relative to centerline 200, from a blade platform to a blade tip, while the corresponding static compressor vanes 250, 252 are positioned downstream of and adjacent to the rotating plurality of compressor blades 246, 248. It is noted that the number of blades, vanes, and compressor stages shown in FIG. 1 were selected for illustrative purposes only, and that other numbers are possible. Plurality of compressor blades 246, 248 for a stage of LP compressor 212 and HP compressor 214 can be mounted to a disk 243, which is mounted to the corresponding one of HP and LP spools 238, 240, with each stage having its own disk 243. Static compressor vanes 250, 252 are mounted to core casing 236 in a circumferential arrangement about rotor 241.

HP turbine 222 and LP turbine 226 respectively include a plurality of turbine stages 254, 256, in which a set of turbine blades 258, 260 are rotated relative to a corresponding set of static turbine vanes 262, 264 (also called a nozzle) to extract energy from the stream of fluid passing through the stage. In a single turbine stage 254, 256, multiple turbine blades 258, 260 can be provided in a ring and can extend radially outwardly relative to centerline 200, from a blade platform to a blade tip, while the corresponding static turbine vanes 262, 264 are positioned upstream of and adjacent to the rotating turbine blades 258, 260. It is noted that the number of blades, vanes, and turbine stages shown in FIG. 1 were selected for illustrative purposes only, and that other numbers are possible. Set of turbine blades 258, 260 for respective ones of plurality of turbine stages 254, 256 can be mounted to a disk 245, which is mounted to the corresponding one of HP and LP spools 238, 240, with each stage having its own disk 245.

In operation, rotating fan 208 supplies ambient air to LP compressor 212, which then supplies pressurized ambient air to HP compressor 214, which further pressurizes the ambient air. The pressurized air from HP compressor 214 is mixed with fuel in combustor 218 and ignited, thereby generating combustion gases 235. Some work is extracted from these gases by HP turbine 222, which drives HP compressor 214. Combustion gases 235 are discharged into LP turbine 226, which extracts additional work to drive LP compressor 212, and combustion gases 235 are ultimately discharged from gas turbine engine 120 via exhaust section 228. The driving of LP turbine 226 drives LP spool 240 to rotate fan 208 and LP compressor 212.

Some of the ambient air supplied by fan 208 can bypass engine core 234 and be used for cooling of portions, especially hot portions, of gas turbine engine 120, and/or used to cool or power other aspects of aircraft 100. In the context of a gas turbine engine, the hottest portions of the gas turbine engine are in combustor 218 and temperatures decrease downstream of combustor 218 as work is extracted in the rotor system and cooling air is introduced into hot gas path 321 (shown in FIG. 3). Turbine section 220 includes first stage HP turbine nozzle 224, the hottest portion of HP turbine 222 as it is directly downstream of combustion section 216. Other sources of cooling fluid can be, but are not limited to, fluid discharged from LP compressor 212 or HP compressor 214.

Figure 3:
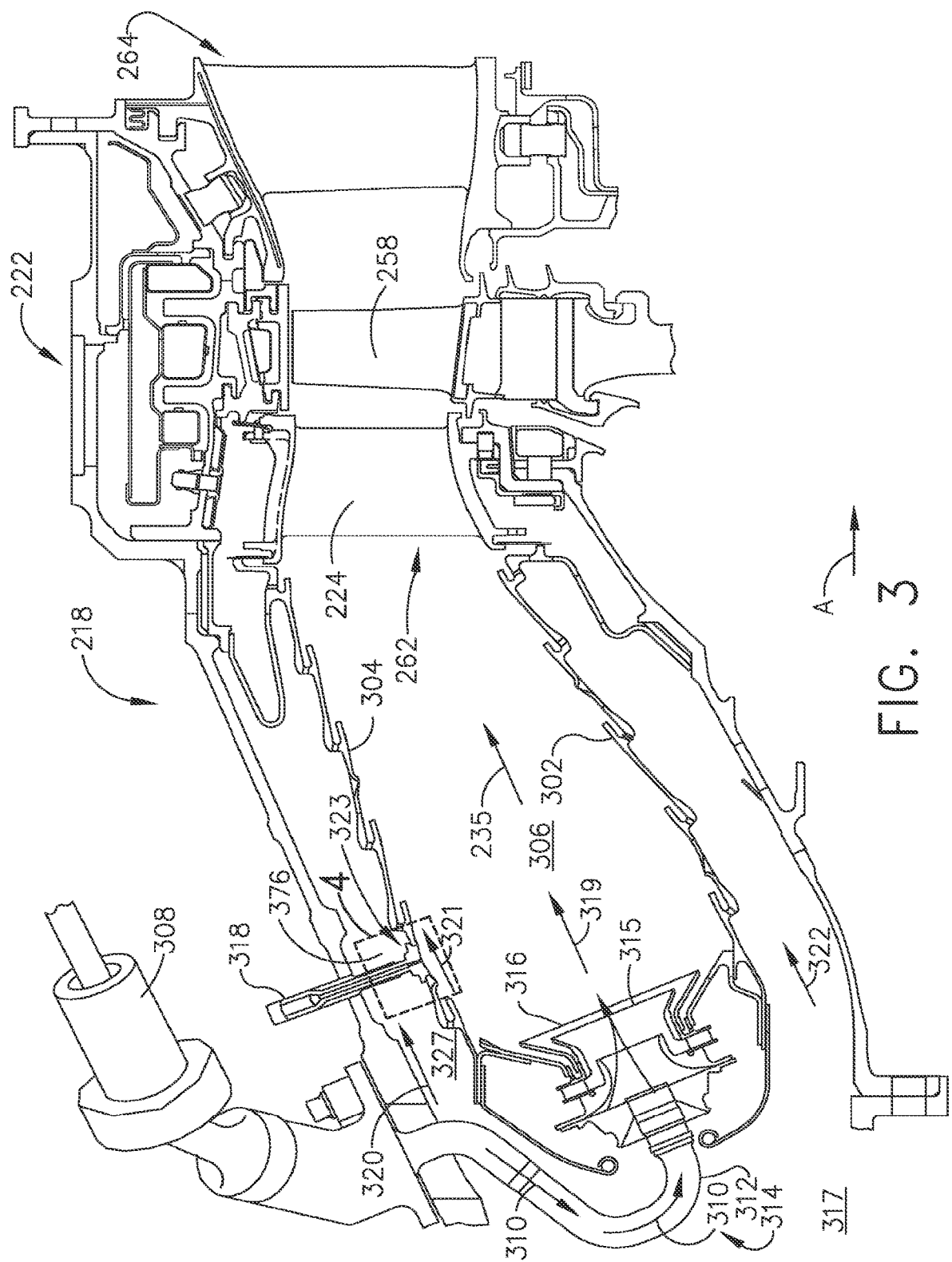

FIG. 3 is a schematic, side-section view of combustion section 216 spanning from an end of compressor section 210 to turbine section 220 of FIG. 1. Combustor 218 includes a combustion inner liner 302 and a combustion outer liner 304 defining a combustion chamber 306 in fluid communication with HP compressor 214 and HP turbine 222. A fuel source 308 provides a supply of fuel 310 through a supply line 312 to fuel-air mixer 316. Fuel-air mixer 316 mixes fuel 310 with a supply of compressor discharge air 314 from HP compressor 214 generating a fuel-air mixture 319.

More specifically, combustor 218 receives a stream of pressurized compressor discharge air 314 from a high pressure compressor discharge outlet 317 (CDP). A mixer portion 315 of compressor discharge air 314 flows into fuel-air mixer 316, where fuel 310 is also injected to mix with compressor discharge air 314 and form fuel-air mixture 319 that is provided to combustion chamber 306 for combustion. Ignition of fuel-air mixture 319 is accomplished by an ignitor 318 extending into combustion chamber 306, and resulting combustion gases 235 flow in axial direction A in a hot gas path 321 toward and into annular, first stage turbine nozzle 224. First stage turbine nozzle 224 is defined by an annular flow channel that includes a plurality of radially extending, circumferentially-spaced static turbine vanes 262, 264 that turn combustion gases 235 so that they flow angularly and impinge upon first stage turbine blades 258 of HP turbine 222. An outer cooling flow portion 320 of compressor discharge air 314 flows around outer liner 304 and an inner cooling flow portion 322 of compressor discharge air 314 flows around inner liner 302.

Ignitor 318 is positioned in an orifice 323 through combustion outer liner 304 and is operable to ignite fuel-air mixture 319 to start or maintain the combustion process, generating flow of combustion gases 235. Once the combustion process starts ignition is complete. Fuel-air mixer 316 is configured to sustain the combustion process with steady supply of compressor discharge air 314 and fuel 310. In combustion chamber 306, energy is released when compressor discharge air 314 is mixed with fuel 310 and ignited within combustion chamber 306. The resulting flow of combustion gases 235 from combustor 218 is directed over turbine blades 258, 260, inducing the rotation of turbine blades 258, 260. The energy of the flow of combustion gases 235 is transformed into mechanical energy.

It should be appreciated that while this description and related drawings are related to an igniter, the disclosure is not so limited. Additional instruments, such as borescope plugs, may also need similar cooling around the hole in the outer liner in which the plug is assembled. A typical gas turbine engine will have at least two ignitors in the combustor and a minimum of at least one borescope plug, although it will be apparent to one skilled in the art that additional or fewer igniters or borescope plugs can be employed in a gas turbine engine without departing from the scope of this disclosure. More often, there are anywhere from two to six borescope plugs in the combustor, as well as additional plugs in the HP compressor, HP turbine and LP turbine. Some or all of these plugs may incorporate the features described herein with respect to the disclosure as would be apparent to one skilled in the art. The igniter is but one example of a combustor component and is utilized to facilitate the reader's understanding of the inventive concept. Moreover, the term "instrument" may refer to any component to be sealed in an orifice in connection with any machinery application, and is not limited with regard to the type or function of the component to be sealed.

Figure 4:
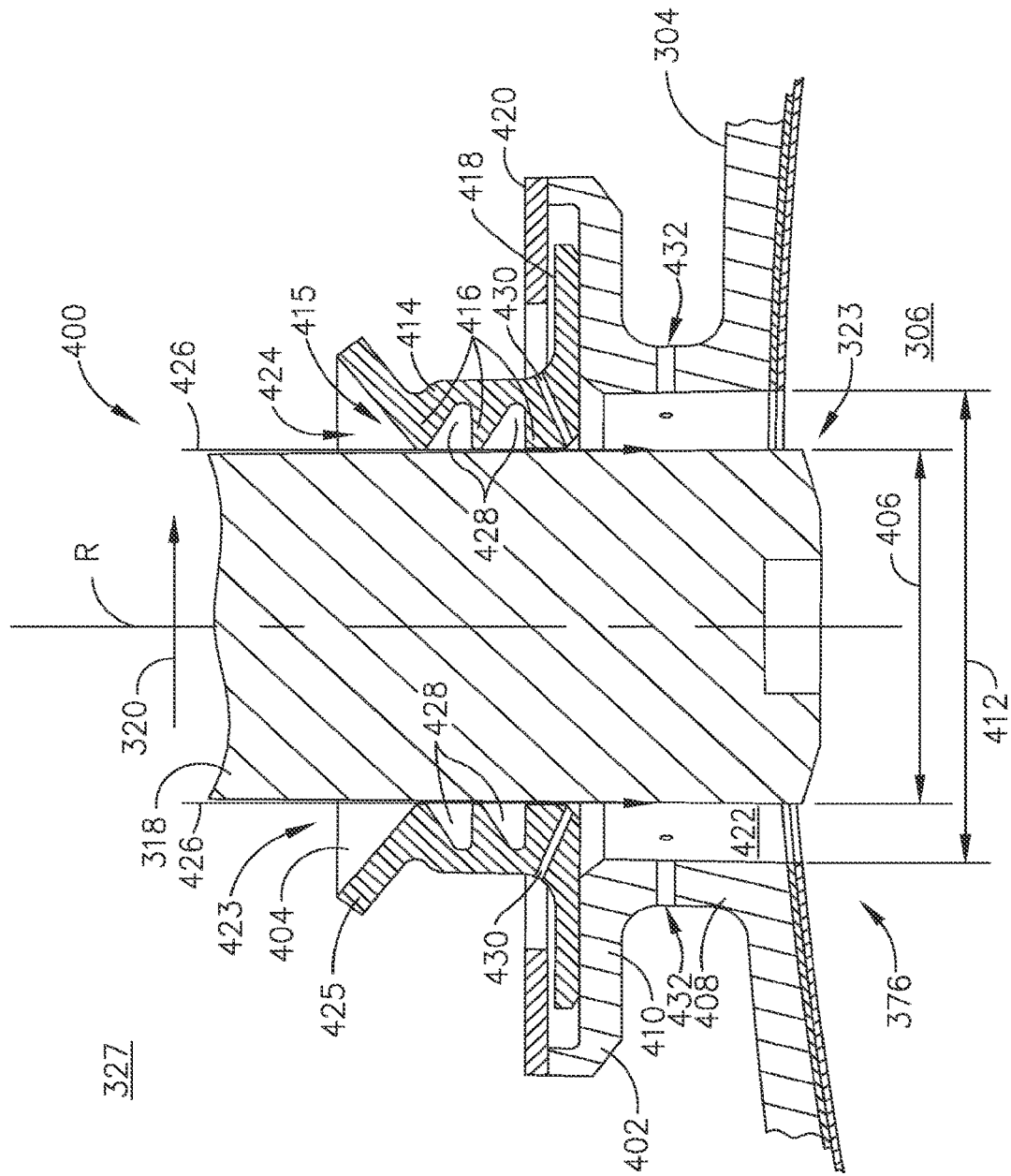

FIG. 4 is a schematic view of a seal assembly 400, also referred to as a leakage management assembly 400, positioned in an ignitor region 376 (shown in FIG. 3). In the example embodiment, seal assembly 400 includes a support tower 402 extending from combustion outer liner 304 and a labyrinth ferrule 404 extending from support tower 402. Both labyrinth ferrule 404 and support tower 402 circumscribe ignitor 318. Ignitor 318 has an ignitor diameter 406.

Support tower 402 includes a support tower body 408 and a support tower flange 410. Support tower body 408 extends from combustion outer liner 304 substantially parallel to ignitor 318 in radial direction R. Support tower flange 410 extends from support tower body 408 substantially perpendicular to ignitor 318. Support tower body 408 includes a support tower diameter 412 that is larger than ignitor diameter 406.

Labyrinth ferrule 404 includes an annular ferrule body 414 having a central bore 415 extending therethrough, a plurality of labyrinthine annular restrictions 416, a ferrule flange 418 and an annular assembly cone 423. Ferrule body 414 includes an annular shape and circumscribes ignitor 318. Restrictions 416 extend from ferrule body 414 radially inward toward ignitor 318. Ferrule flange 418 extends from ferrule body 414 away from ignitor 318 to form an annular disc that is positioned on support tower flange 410. A retainer 420 is coupled to support tower flange 410 and extends towards ferrule body 414 such that ferrule flange 418 is covered by retainer 420 and captured by retainer 420. Retainer 420 allows labyrinth ferrule 404 to move while maintaining a seal. Ferrule flange 418, support tower body 408, and ignitor 318 cooperate to define a support tower downstream cavity 422.

Ferrule body 414 includes annular assembly cone 423 at a radially outer first end 425 of ferrule body 414. Ferrule body 414 and ignitor 318 define a leakage gap 424 therebetween. Annular assembly cone 423 is shaped as an annular convergent lip that converges from a wider diameter at first end 425 to a narrower diameter as it transitions into ferrule body 414. Annular assembly cone 423 and leakage gap 424 are configured to facilitate assembly of seal assembly 400. In the exemplary embodiment, leakage gap 424 receives a leakage flow 426 of outer cooling flow portion 320. Restrictions 416 extend into leakage gap 424 and are configured to reduce the velocity and magnitude of leakage flow 426. In the exemplary embodiment, labyrinth ferrule 404 includes three restrictions 416. However, in alternative embodiments, labyrinth ferrule 404 includes any number of restrictions 416 that enable labyrinth ferrule 404 to operate as described herein. Restrictions 416, ignitor 318, and labyrinth ferrule body 414 cooperate to define a tortuous path including a plurality of intermediate cavities 428 within leakage gap 424. Each intermediate cavity 428 is at an intermediate cavity pressure. In the exemplary embodiment, labyrinth ferrule 404 includes two intermediate cavities 428. However, in alternative embodiments, labyrinth ferrule 404 includes any number of intermediate cavities 428 that enable labyrinth ferrule 404 to operate as described herein.

The velocity of leakage flow 426 through leakage gap 424 is at least partially determined by the ratio of the pressure of leakage flow 426 within a first region 327 outside outer liner 304, upstream from leakage gap 424, to the pressure of leakage flow 426 within support tower downstream cavity 422. The difference in pressure between the pressure of leakage flow 426 within first region 327 and the pressure of leakage flow 426 within support tower downstream cavity 422 is the change in pressure. The larger the change in pressure (or the higher the ratio of the pressure of leakage flow 426 within first region 327 to the pressure of leakage flow 426 within support tower downstream cavity 422), the faster the velocity of leakage flow 426 exiting leakage gap 424. Conversely, the smaller the change in pressure (or the lower the ratio of the pressure of leakage flow 426 within first region 327 to the pressure of leakage flow 426 within support tower downstream cavity 422), the slower the velocity of leakage flow 426 exiting leakage gap 424. Restrictions 416 within leakage gap 424 reduce the pressure of leakage flow 426 at each intermediate cavity 428 within leakage gap 424. Reducing the pressure of leakage flow 426 within leakage gap 424 by means of restrictions 416 decreases the subsequent driving pressure for the subsequent cavity, therefore increasing the losses from entrance to exit, manifesting in lower flows and lower exit velocities. Note that the upstream and downstream pressures are set by the turbomachinery and do not change based on any of these small changes. As such, restrictions within leakage gap 424 reduce the velocity of leakage flow 426 exiting leakage gap 424. If the velocity of leakage flow 426 into support tower downstream cavity 422 is too high, combustion gases 235 within combustion chamber 306 will be entrained in leakage flow 426 and flow radially outward into support tower downstream cavity 422. Combustion gases 235 within support tower downstream cavity 422 increase the temperature of support tower 402 and reduce the life span of support tower 402.

During operations, outer cooling flow portion 320 of compressor discharge air 314 flows around combustion outer liner 304 and into leakage gap 424. Restrictions 416 decrease the pressure of leakage flow 426 such that the velocity of leakage flow 426 exiting leakage gap 424 is reduced. The reduced velocity of leakage flow 426 exiting leakage gap 424 reduces the entrainment of combustion gases 235 within support tower downstream cavity 422 and reduces the temperature of support tower 402. Additionally, reducing the entrainment of combustion gases 235 within support tower downstream cavity 422 reduces the flow of leakage flow 426.

Labyrinth ferrule 404 also defines a plurality of first cooling holes 430 configured to channel a flow of cooling air to targeted areas of labyrinth ferrule 404, support tower 402, and ignitor 318. In the exemplary embodiment, first cooling holes 430 channel cooling air to support tower downstream cavity 422. Channeling cooling air to support tower downstream cavity 422 cools support tower body 408, increasing the life span of support tower body 408. A plurality of second cooling holes 432 extend circumferentially around support tower 402 to provide additional passages for cooling flow from first region 327 to support tower downstream cavity 422.

Figure 5:
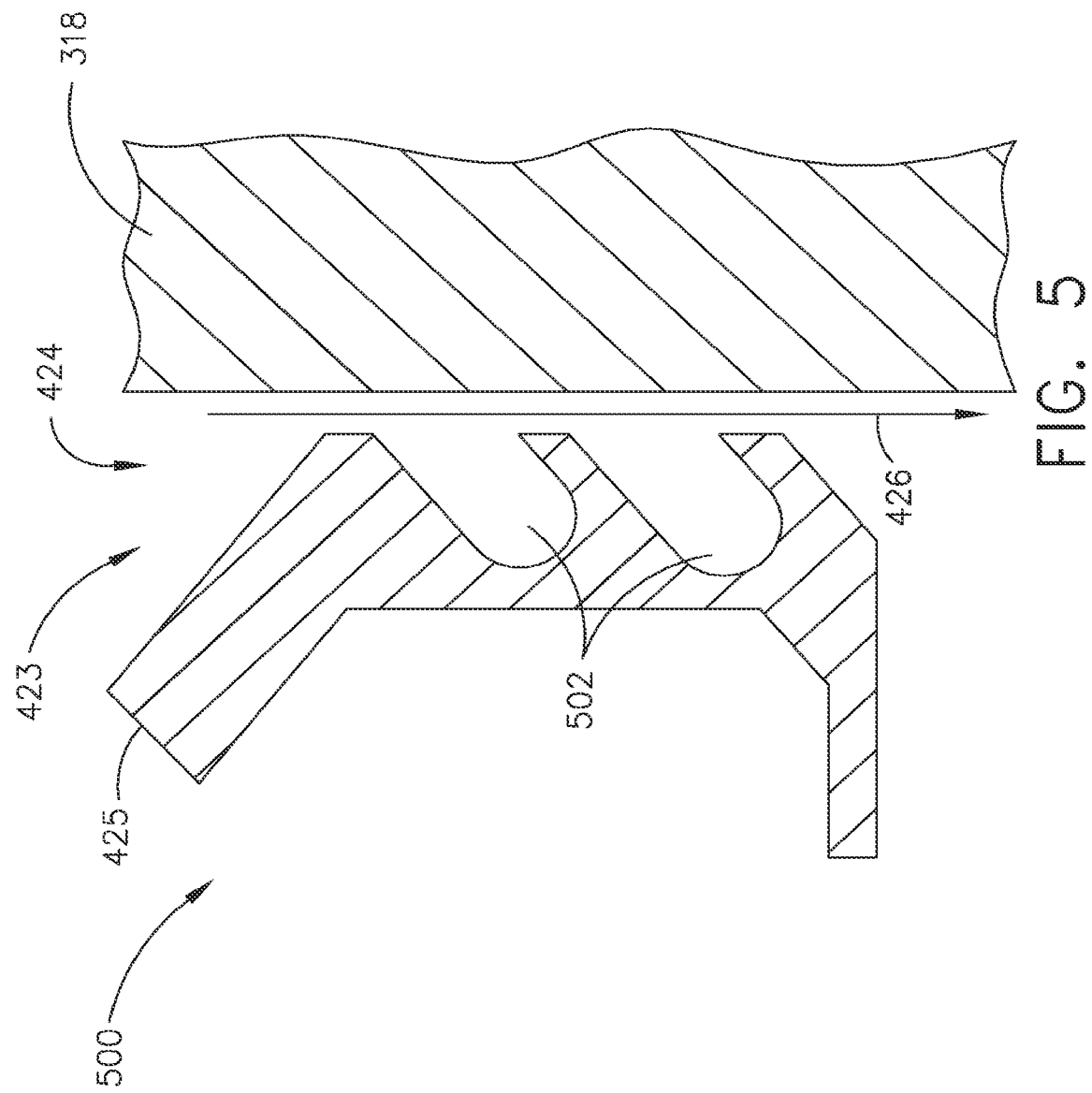

FIG. 5 is a partial schematic diagram of another embodiment of the labyrinth ferrule of seal assembly 400, designated labyrinth ferrule 500, for use in combustor 218. Labyrinth ferrule 500 has a similar structure as labyrinth ferrule 404 except labyrinth ferrule 500 includes a plurality of intermediate cavities 502 that are slanted against leakage flow 426 within leakage gap 424, which decreases the velocity of leakage flow 426 within leakage gap 424.

Figure 6:
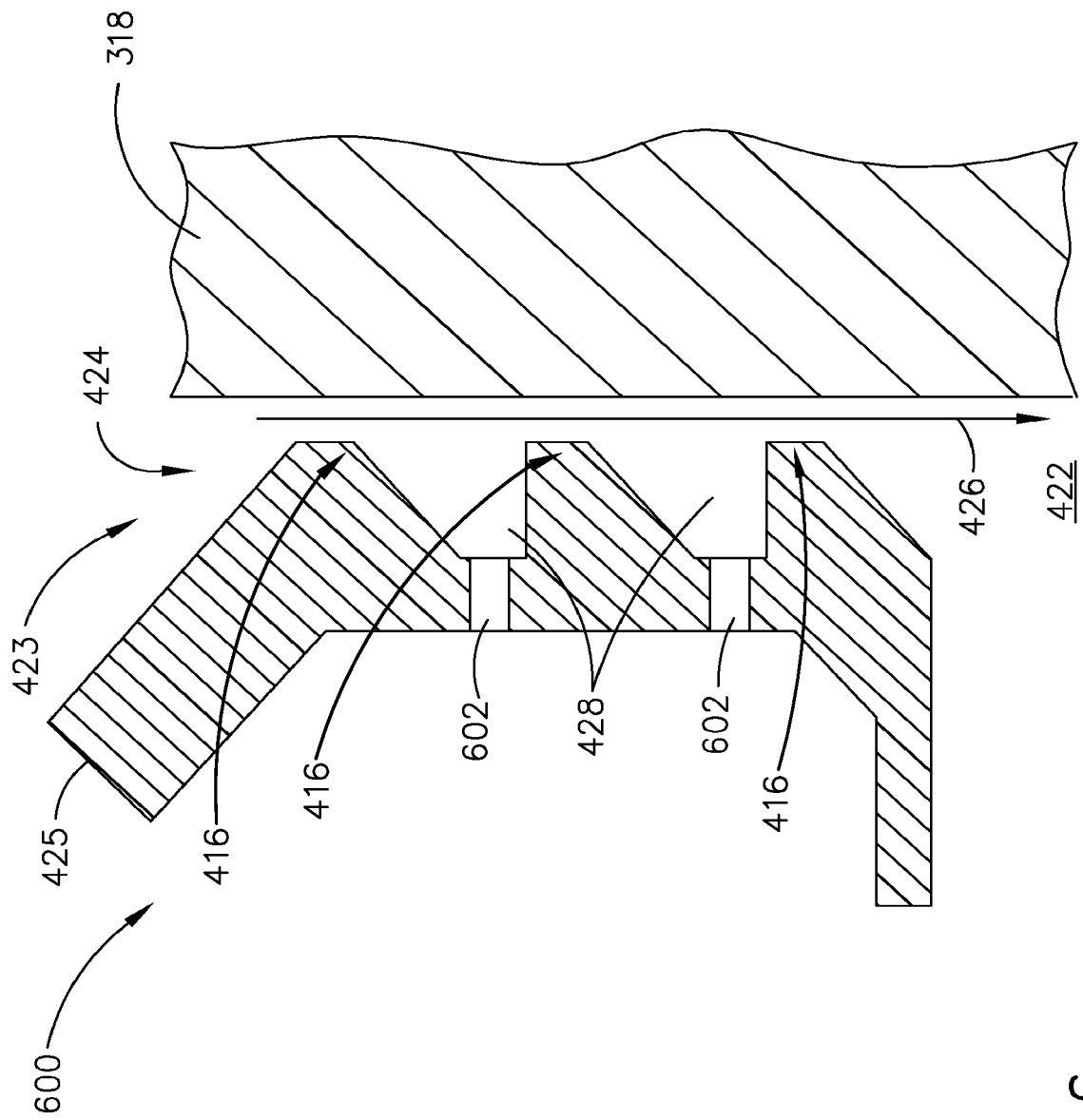

FIG. 6 is a partial schematic diagram of another embodiment of the labyrinth ferrule of seal assembly 400, designated labyrinth ferrule 600, for use in combustor 218. Labyrinth ferrule 600 has a similar structure as labyrinth ferrule 404 except labyrinth ferrule 600 defines a plurality of cooling holes 602 configured to channel a flow of cooling air into intermediate cavities 428. Cooling holes 602 allow for the introduction of additional flow into leakage gap 424 at different pressures. The additional flow at different pressures allows the pressure ratio, velocity, and flow rate of leakage flow 426 into support tower downstream cavity 422 to be tuned. The additional flow of cooling air into leakage gap 424 through intermediate cavities 428 is configured to maintain a positive purge into support tower downstream cavity 422 and hot gas path 321.

Figure 7:
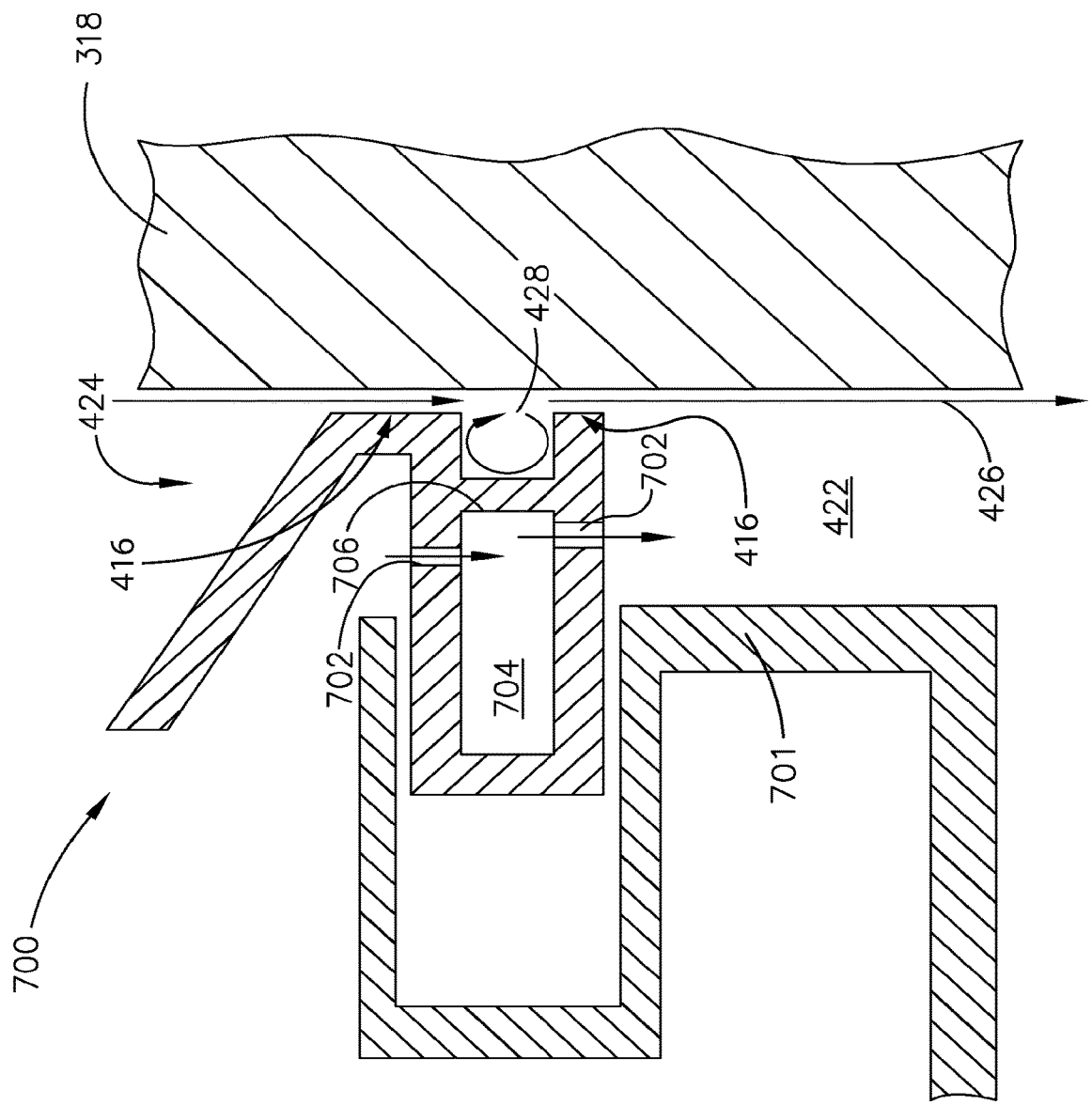

FIG. 7 is a partial schematic diagram of another embodiment of the labyrinth ferrule of seal assembly 400, designated labyrinth ferrule 700, for use in combustor 218. A support tower 701 can circumscribe the ignitor 318. Labyrinth ferrule 700 has a similar structure as labyrinth ferrule 404 except labyrinth ferrule 700 defines a plurality of cooling holes 702 and a plurality of secondary intermediate cavities 704 (only one secondary intermediate cavity 704 is shown). Secondary intermediate cavities 704 are isolated from intermediate cavities 428 by a wall 706. The labyrinth ferrule 700 can include any suitable number of one or more intermediate cavities 428. As a non-limiting example, the labyrinth ferrule 700 can include a single intermediate cavity 428, as illustrated. Cooling holes 702 are configured to channel a flow of cooling air into and out of secondary intermediate cavities 704. Cooling holes 702 and secondary intermediate cavities 704 allow for the introduction of additional flow into support tower downstream cavity 422 at different pressures. The additional flow at different pressures allows the pressure ratio, velocity, and flow rate of flow through leakage gap 424 into support tower downstream cavity 422 to be tuned.

Figure 8:
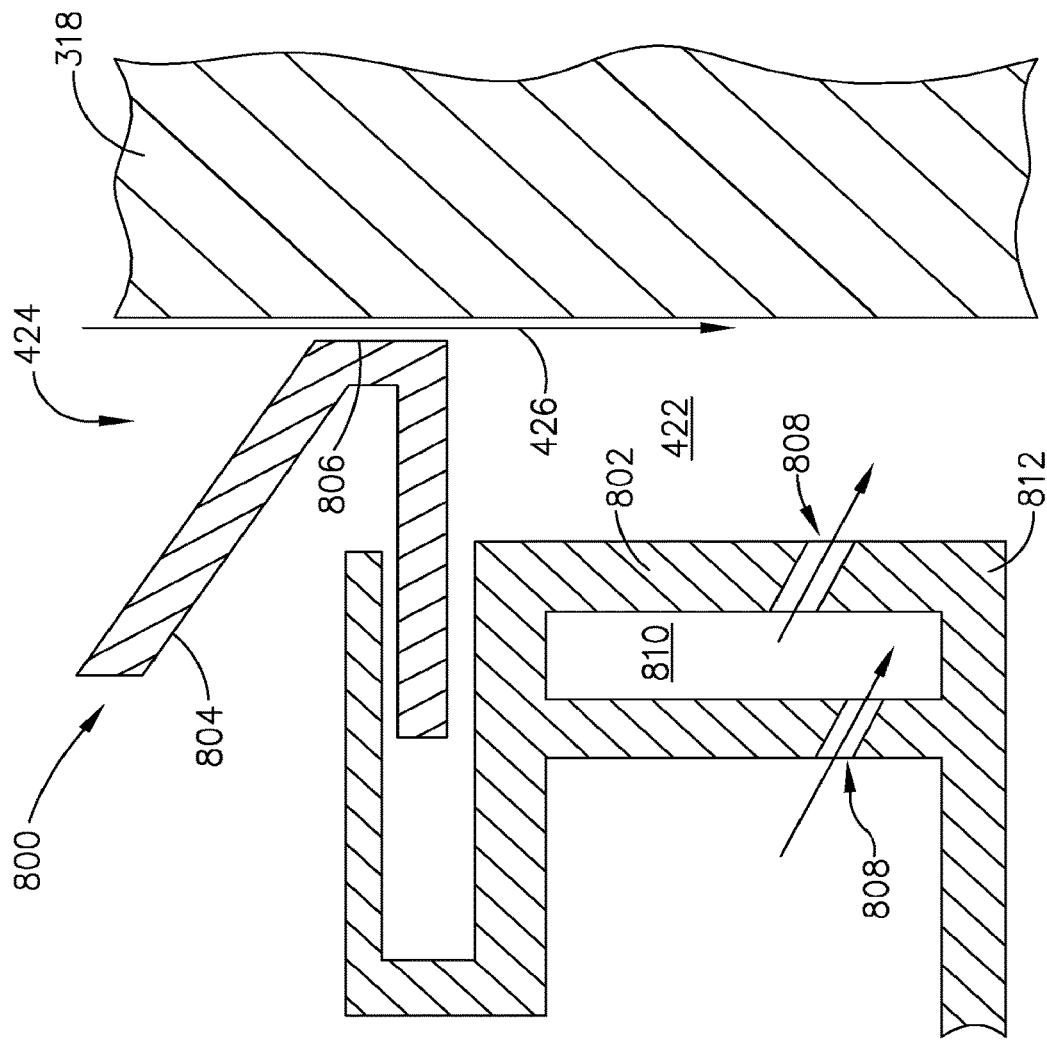

FIG. 8 is a partial schematic diagram of another embodiment of the seal assembly, designated seal assembly 800 or leakage management assembly 800, for use in combustor 218. Seal assembly 800 includes a support tower 802 and a labyrinth ferrule 804. Labyrinth ferrule 804 has a similar structure as labyrinth ferrule 404 except labyrinth ferrule 804 is illustrated with one labyrinth restriction 806 rather than three restrictions 416. However, labyrinth ferrule 804 may include any number of labyrinth restrictions 806 that enable seal assembly 800 to operate as described herein, including, without limitation, three labyrinth restrictions 806. Support tower 802 includes a plurality of support tower cooling holes 808 and a support tower intermediate cavity 810. Support tower cooling holes 808 are configured to channel a flow of cooling air into and out of support tower intermediate cavity 810. Support tower cooling holes 808 and support tower intermediate cavity 810 allow for the introduction of additional flow into support tower downstream cavity 422 at different pressures. The additional flow at different pressures allows the pressure ratio, velocity, and flow rate of leakage flow 426 into support tower downstream cavity 422 to be tuned. Additionally, a corner 812 of support tower 802 where support tower 802 attaches to combustion outer liner 304 is difficult to cool. Support tower cooling holes 808 and support tower intermediate cavity 810 channel a flow of cooling fluid directly to corner 812. Thus, support tower cooling holes 808 and support tower intermediate cavity 810 allow for increased cooling of a difficult to cool corner 812.

Figure 9:
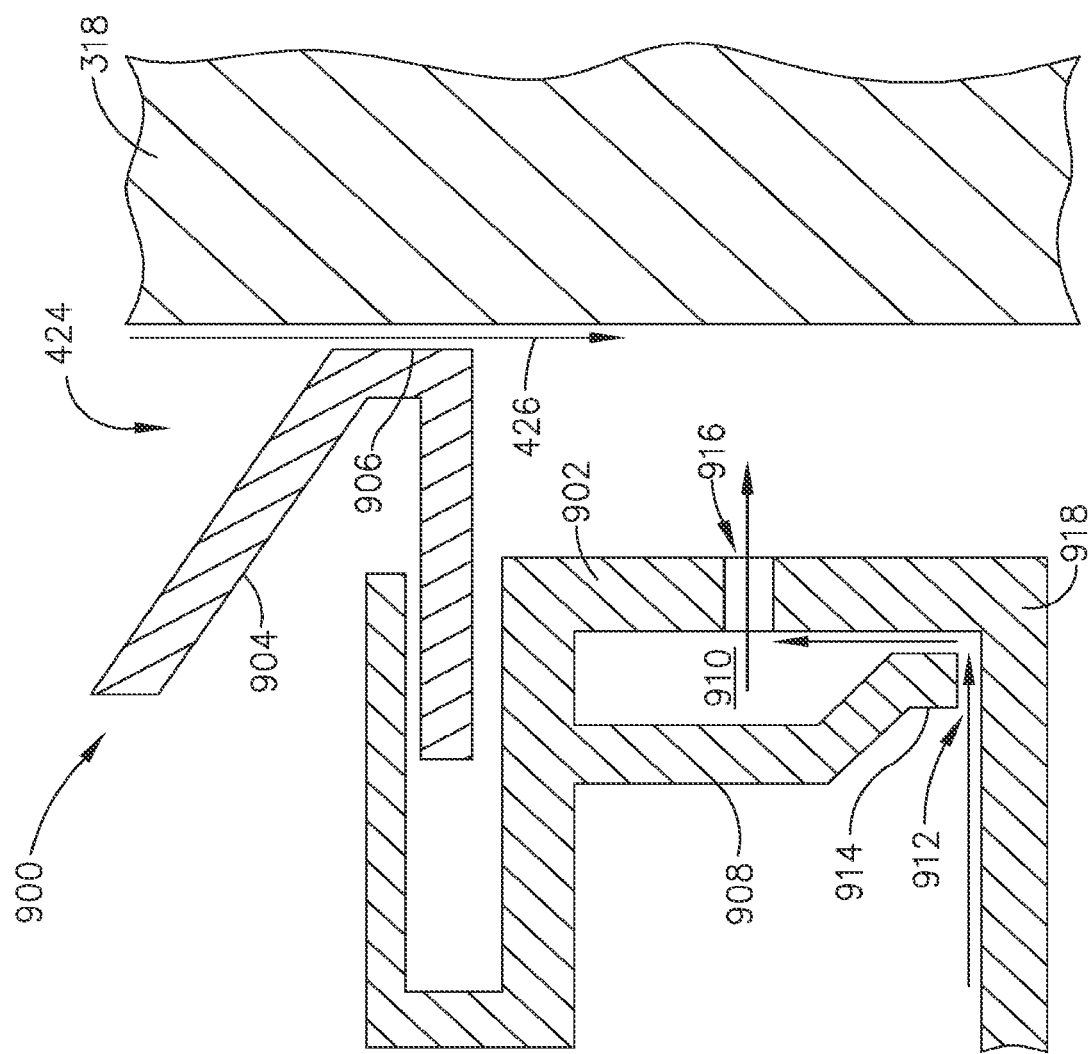

FIG. 9 is a partial schematic diagram of another embodiment of the seal assembly, designated seal assembly 900 or leakage management assembly 900, for use in combustor 218. Seal assembly 900 includes a support tower 902 and a labyrinth ferrule 904. Labyrinth ferrule 904 has a similar structure as labyrinth ferrule 404 except labyrinth ferrule 904 is illustrated with one labyrinth restriction 906 rather than three restrictions 416. However, labyrinth ferrule 904 may include any number of labyrinth restrictions 906 that enable seal assembly 900 to operate as described herein, including, without limitation, three labyrinth restrictions 906. Support tower 902 includes a wall 908 that at least partially encloses a support tower intermediate cavity 910. A cooling slot 912 that extends 360° about a distal end 914 of wall 908 permits cooling air flow into support tower intermediate cavity 910 and a plurality of cooling holes 916 are configured to channel a flow of cooling air out of support tower intermediate cavity 910. Cooling slot 912, support tower cooling holes 916 and support tower intermediate cavity 910 allow for the introduction of additional flow into support tower downstream cavity 422 at different pressures. The additional flow at different pressures allows the pressure ratio, velocity, and flow rate of leakage flow 426 into support tower downstream cavity 422 to be tuned. Additionally, a corner 918 of support tower 902 where support tower 902 attaches to combustion outer liner 304 is difficult to cool. Support tower cooling holes 916 and support tower intermediate cavity 910 channel a flow of cooling fluid directly to corner 918. Thus, support tower cooling holes 916 and support tower intermediate cavity 910 allow for the cooling of a difficult to cool corner 918. Additionally, wall 908 is coupled to or formed with support tower 902, which becomes a single component. Wall 908 at least partially defines support tower intermediate cavity 910. The support tower 902 can include any number of one or more support er cooling holes 916. As a non-limiting example, support tower 902 can include a single support tower cooling hole 916.

The above-described leakage management assembly provides an efficient method for channeling leakage air and cooling air through the leakage management assembly into a support tower cavity within a combustor liner. The leakage management assembly includes a ferrule having a plurality of labyrinthine annular restrictions that reduce the velocity of the leakage air and cooling air entering the support tower cavity. Reducing the velocity of the leakage air reduces the entrainment of high temperature combustion gases from the combustor into the support tower cavity, which facilitates reducing the thermal stress on the support tower and the labyrinth ferrule. The reduced thermal stress may permit less leakage air to cool and buffer the support tower cavity. The remaining leakage air is used to cool difficult to cool regions within the support tower which further reduces the thermal stress on the support tower. Reductions in leakage air allows for this air to be used for dedicated cooling, which minimizes the total air required to meet part life requirements.

Exemplary embodiments of a leakage management assembly are described above in detail. The leakage management assembly, and methods of operating the leakage management assembly, are not limited to the specific embodiments described herein, but rather, components of systems and/or steps of the methods may be utilized independently and separately from other components and/or steps described herein. For example, the methods may also be used in combination with other systems requiring cooling fluid into a hot gas path, and are not limited to practice with only the systems and methods as described herein. Rather, the exemplary embodiment can be implemented and utilized in connection with many other machinery applications that are currently configured to receive and accept an instrument leakage flow into a hot gas path that by its necessity has an associated leakage flow and may possibly also need dedicated cooling air flow.

Example methods and apparatus for channeling leakage air through a labyrinth ferrule into a support tower cavity within a combustor liner are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
   a liner at least partially defining a fluid path and separating the fluid path from a region on an opposing side of the liner, the liner including an orifice extending between the fluid path and the region;
   an instrument extending through at least a portion of the orifice, the instrument being one of either an igniter or a borescope plug; and
   a seal assembly coupled to the liner, the seal assembly being positioned within the orifice and at least partially surrounding the instrument, the seal assembly having a labyrinth ferrule, the labyrinth ferrule having an annular ferrule body having a central bore extending therethrough, the central bore defining a bore centerline, the annular ferrule body comprising:
      an annular assembly cone formed at a first end of the annular ferrule body, the annular assembly cone comprising an annular convergent lip;
      an inner surface provided on an axially opposite side of the annular ferrule body from the annular convergent lip, with respect to the bore centerline;
      at least one labyrinth annular restriction located axially between the annular assembly cone and the inner surface with respect to the bore centerline, the at least one labyrinth annular restriction extending radially toward the central bore and terminating radially prior, with respect to the bore centerline, to any portion of the instrument in the central bore to define a leakage gap therebetween;
      a first ferrule intermediate cavity defining an interior cavity of the annular ferrule body encased by the annular ferrule body, the first ferrule intermediate cavity being spaced from the at least one labyrinth annular restriction; and
      at least one cooling hole extending through the annular ferrule body and being fluidly coupled to the first intermediate ferrule cavity;
      wherein the at least one labyrinth annular restriction is configured to reduce a velocity of a leakage fluid within the leakage gap, while allowing at least a portion of the leakage fluid to flow past the at least one labyrinth annular restriction and through the leakage gap.

2. The turbine engine of claim 1, wherein the at least one labyrinth annular restriction is included within a plurality of labyrinthine annular restrictions having a first annular restriction and a second annular restriction.

3. The turbine engine of claim 1, wherein the labyrinth ferrule further comprises:
   a second ferrule intermediate cavity at least partially formed by the at least one labyrinth annular restriction and opening to the leakage gap, the second ferrule intermediate cavity being radially spaced from the first ferrule intermediate cavity; and
   a wall isolating the first ferrule intermediate cavity and the second ferrule intermediate cavity.

4. The turbine engine of claim 1, wherein the seal assembly further comprises a support tower that confronts at least a portion of the labyrinth ferrule, the support tower being radially spaced from the instrument, with respect to the bore centerline, to define a cavity that is downstream of the labyrinth ferrule.

5. The turbine engine of claim 1, wherein the at least one cooling hole is configured to channel cooling air downstream of said labyrinth ferrule.

6. The turbine engine of claim 1, wherein:
   the at least one cooling hole is a first cooling hole directly fluidly coupled to the first ferrule intermediate cavity and defining an inlet to the first ferrule intermediate cavity; and
   the annular ferrule body further comprises a second cooling hole directly fluidly coupled to the first ferrule intermediate cavity and defining an outlet from the first ferrule intermediate cavity.

7. The turbine engine of claim 6, further comprising a support tower that confronts at least a portion of the labyrinth ferrule, the support tower being radially spaced from the instrument, with respect to the bore centerline, to define a cavity that is downstream of the labyrinth ferrule, the second cooling hole exhausting to the cavity.

8. The turbine engine of claim 1, further comprising a combustor, wherein the liner is a combustor liner, the fluid path is a hot gas path, and the instrument is the igniter.

9. The turbine engine of claim 1, further comprising a compressor section, wherein the liner is provided within the compressor section and the instrument is the borescope plug.

10. The turbine engine of claim 1, further comprising a second ferrule intermediate cavity separate from the first ferrule intermediate cavity, the second ferrule intermediate cavity at least partially formed by the at least one labyrinth annular restriction and opening to the central bore.

11. A turbine engine comprising:
    a liner at least partially defining a fluid path and separating the fluid path from a region on an opposing side of the liner, the liner including an orifice extending between the fluid path and the region;
    an instrument extending through at least a portion of the orifice, the instrument being one of either an igniter or a borescope plug; and
    a seal assembly coupled to the liner, the seal assembly being positioned within the orifice and at least partially surrounding the instrument, the seal assembly comprising:
       a support tower spaced from the instrument to define a cavity therebetween, the support tower comprising:
          an upper surface and a lower surface, opposite the upper surface, the lower surface contacting a respective portion of the liner;
          a support tower intermediate cavity; and
          at least one fluid passage fluidly coupled to the support tower intermediate cavity; and
       a labyrinth ferrule having an annular ferrule body having a central bore extending therethrough, the central bore defining a bore centerline, the annular ferrule body comprising:
          an annular assembly cone formed at a first end of the annular ferrule body, the annular assembly cone comprising an annular convergent lip;
          an inner surface provided on an axially opposite side of the annular ferrule body from the annular convergent lip, with respect to the bore centerline; and
          at least one labyrinth annular restriction located axially between the annular assembly cone and the inner surface with respect to the bore centerline, the at least one labyrinth annular restriction extending radially toward the central bore and terminating radially prior, with respect to the bore centerline, to any portion of the instrument in the central bore to define a leakage gap therebetween, the at least one labyrinth annular restriction being axially spaced upstream of the support tower intermediate cavity, with respect to the bore centerline;

wherein the at least one labyrinth annular restriction is configured to reduce a velocity of a leakage fluid within the leakage gap, while allowing at least a portion of the leakage fluid to flow past the at least one labyrinth annular restriction and through the leakage gap.

12. The turbine engine of claim 11, wherein the at least one labyrinth annular restriction is included within a plurality of labyrinthine annular restrictions having a first annular restriction and a second annular restriction, and wherein the labyrinth ferrule further comprises a first ferrule intermediate cavity formed between the first annular restriction, the second annular restriction, and the leakage gap.

13. The turbine engine of claim 11, wherein the at least one fluid passage comprises:

a first fluid passage extending through the support tower and fluidly coupling a flow of a cooling fluid to the support tower intermediate cavity, the first fluid passage defining an inlet to the support tower intermediate cavity; and a second fluid passage extending through the support tower and fluidly coupling the support tower intermediate cavity to a portion of the cavity, the second fluid passage defining an outlet of the support tower intermediate cavity;

wherein the support tower intermediate cavity, the first fluid passage, and the second fluid passage are configured to reduce a velocity of the flow of the cooling fluid.

14. The turbine engine of claim 13, wherein the first fluid passage is a slot that extends circumferentially about an entirety of the bore centerline.

15. The turbine engine of claim 13, wherein the second fluid passage is included within a plurality of second fluid passages circumferentially spaced along the support tower with respect to the bore centerline.

16. The turbine engine of claim 11, wherein the at least one fluid passage includes an inlet and an outlet, with the inlet being axially spaced outwardly from the outlet, with respect to the bore centerline.

17. The turbine engine of claim 11, further comprising a combustor, wherein the liner is a combustor liner, the fluid path is a hot gas path, and the instrument is the igniter.

18. The turbine engine of claim 11, further comprising a compressor section, wherein the liner is provided within the compressor section and the instrument is the borescope plug.

* * * * *